United States Patent
Mo et al.

(10) Patent No.: US 9,886,295 B2
(45) Date of Patent: Feb. 6, 2018

(54) SETTING SERVER OPERATING SYSTEM AS MAIN DOMAIN TO PROVIDE INTEGRATED USER INTERFACE FOR A PLURALITY OF CLIENT OPERATING SYSTEM SET AS SUB-DOMAINS

(75) Inventors: Sang-Dok Mo, Hwaseong-si (KR); Bok-Deuk Jeong, Yongin-si (KR); Sang-Bum Suh, Seoul (KR); Sung-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1322 days.

(21) Appl. No.: 12/894,978

(22) Filed: Sep. 30, 2010

(65) Prior Publication Data

US 2011/0154328 A1    Jun. 23, 2011

(30) Foreign Application Priority Data

Dec. 21, 2009    (KR) .................. 10-2009-0128307

(51) Int. Cl.
*G06F 9/46* (2006.01)
*G06F 9/455* (2006.01)
(Continued)

(52) U.S. Cl.
CPC .......... *G06F 9/45541* (2013.01); *G06F 9/455* (2013.01); *G06F 3/00* (2013.01);
(Continued)

(58) Field of Classification Search
CPC . G06F 9/46; G06F 9/48; G06F 9/4806; G06F 9/4445; G06F 3/00; G06F 3/01; G06F 9/455; G06F 9/45533
See application file for complete search history.

(56) References Cited

U.S. PATENT DOCUMENTS 5,673,403 A * 9/1997 Brown .................. G06F 9/4445
                                                        715/744
7,272,831 B2    9/2007 Cota-Robles et al.
(Continued)

FOREIGN PATENT DOCUMENTS

JP    2007-525776        9/2007
JP    2007-299253 A    11/2007
(Continued)

OTHER PUBLICATIONS

Korean Office Action dated May 30, 2016 in counterpart Korean Patent Application No. 10-2009-0128307 (7 pages, with English translation).

(Continued)

*Primary Examiner* — James J Lee
*Assistant Examiner* — Caroline H Arcos
(74) *Attorney, Agent, or Firm* — NSIP Law

(57) ABSTRACT

An apparatus and method for providing an integrated user interface for a variety of operating systems are provided. When a user request execution of an application included in a second operating system an application of a first operating system is in the foreground of a display, the apparatus switches the application included in the second operating system to the foreground of the display without the need for a separate window. One of a server operating system and client operating systems may be set as a main domain that provides an integrated graphic user interface with respect to applications executed on a plurality of operating systems. The operating systems not set to the main domain may be set as sub-domains each of which provides application information to the main domain in response to a request from the main domain. In response to an application execution request, the server operating system may switch an operat- (Continued)

ing system in which the corresponding application is present to the foreground of the display.

20 Claims, 10 Drawing Sheets

(51) Int. Cl.
*G06F 9/44* (2006.01)
*G06F 9/48* (2006.01)
*G06F 3/00* (2006.01)
*G06F 3/01* (2006.01)

(52) U.S. Cl.
CPC .............. *G06F 3/01* (2013.01); *G06F 9/4443* (2013.01); *G06F 9/4445* (2013.01); *G06F 9/46* (2013.01); *G06F 9/465* (2013.01); *G06F 9/48* (2013.01); *G06F 9/4806* (2013.01); *G06F 2009/45575* (2013.01)

(56) References Cited

U.S. PATENT DOCUMENTS

| | | | |
|---|---|---|---|
| 7,356,735 | B2 | 4/2008 | Bennett et al. |
| 7,681,134 | B1 * | 3/2010 | Grechishkin et al. ........ 715/740 |
| 7,694,298 | B2 | 4/2010 | Goud et al. |
| 7,987,432 | B1 * | 7/2011 | Grechishkin et al. ........ 715/778 |
| 2005/0091486 | A1 | 4/2005 | Avraham et al. |
| 2006/0085785 | A1 | 4/2006 | Garrett |
| 2006/0136912 | A1 * | 6/2006 | Robinson ................ G06F 21/53 718/1 |
| 2006/0146057 | A1 | 7/2006 | Blythe |
| 2007/0006228 | A1 | 1/2007 | Grobman et al. |
| 2007/0022389 | A1 * | 1/2007 | Ording .................. G06F 3/0481 715/790 |
| 2007/0180450 | A1 * | 8/2007 | Croft et al. ....................... 718/1 |
| 2009/0106754 | A1 | 4/2009 | Liu et al. |
| 2009/0113424 | A1 | 4/2009 | Chen et al. |
| 2009/0125902 | A1 | 5/2009 | Ghosh et al. |
| 2009/0165133 | A1 | 6/2009 | Hwang et al. |
| 2009/0193245 | A1 | 7/2009 | Isaacson |
| 2010/0037243 | A1 * | 2/2010 | Mo et al. ...................... 719/328 |

FOREIGN PATENT DOCUMENTS

| | | |
|---|---|---|
| KR | 10-2005-0039530 | 4/2005 |
| KR | 10-2006-0079088 | 7/2006 |
| KR | 10-2008-0112714 A | 11/2006 |
| KR | 10-2007-0062607 | 6/2007 |
| KR | 10-2007-0086325 | 8/2007 |
| KR | 10-2008-0020639 | 3/2008 |
| KR | 10-2008-0079549 | 9/2008 |
| KR | 10-2009-0068833 | 6/2009 |
| KR | 10-2009-0078695 | 7/2009 |
| WO | WO 2005/041070 A1 | 5/2005 |

OTHER PUBLICATIONS

Korean Notice of Allowance dated Aug. 2, 2016 in counterpart Korean Patent Application No. 10-2009-0128307 (3 pages, with English translation).
Korean Office Action dated Dec. 14, 2015 in counterpart Korean Application No. 10-2009-0128307 (16 pages in Korean with English translation).

* cited by examiner

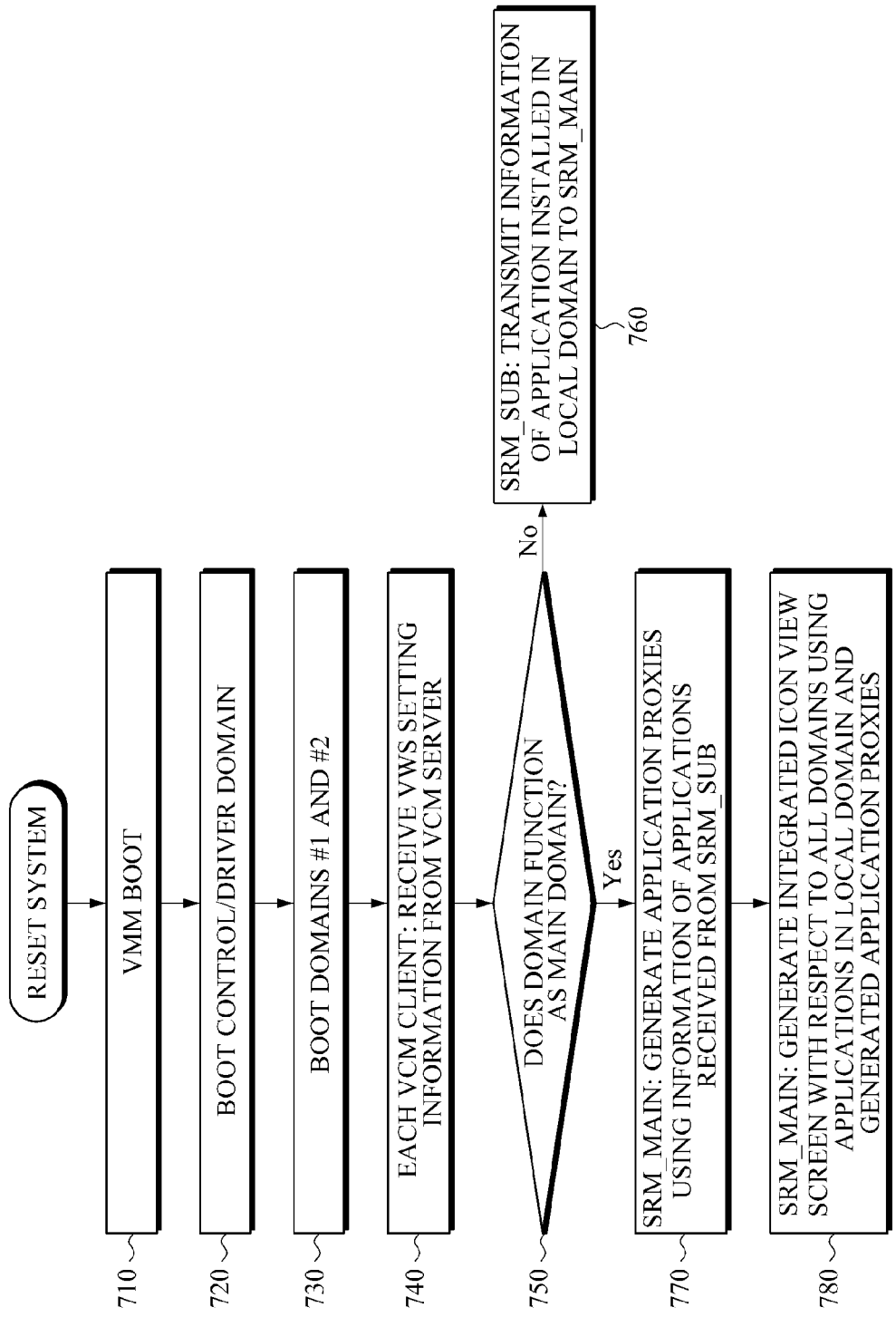

SETTING SERVER OPERATING SYSTEM AS MAIN DOMAIN TO PROVIDE INTEGRATED USER INTERFACE FOR A PLURALITY OF CLIENT OPERATING SYSTEM SET AS SUB-DOMAINS

CROSS-REFERENCE TO RELATED APPLICATION(S)

This application claims the benefit under 35 U.S.C. § 119(a) of Korean Patent Application No. 10-2009-0128307, filed on Dec. 21, 2009, the entire disclosure of which is incorporated herein by reference for all purposes.

BACKGROUND

1. Field

The following description relates to an apparatus and method for providing an integrated user interface for a plurality of operating systems in a virtualized environment.

2. Description of the Related Art

With the increase in the use of mobile terminals and the ever widening access to the Internet, various forms of information and software are freely and easily shared. This access to information and software enlarges the freedom of users, but at the same time, it reduces the availability and the security of mobile terminals.

The increased sharing of information between mobile terminals and the use of new software in such devices may encourage the spread of malicious software and malware. Such malicious software and malware may cause malfunction of a device and/or make public a user's private information. An example of a method of preventing such drawbacks is virtualization technology. Recent research on virtualization technologies have primarily been dedicated to a virtual machine monitor. However, research on a technology for providing a secure and convenient use environment where a user uses a device that supports a plurality of operating systems has not been performed.

SUMMARY

In one general aspect, there is provided a virtualization apparatus comprising a hardware, a display, a virtual machine monitor configured to support the hardware such that the hardware has a plurality of operating systems running thereon, and a plurality of operating systems configured to be operated on the virtual machine monitor, the plurality of operating systems including a server operating system and one or more client operating systems, wherein the server operating system includes a virtual window manager (VWM) server to switch an operating system that includes an application requested for execution to the foreground of the display, in response to the application execution request, and wherein the server operating system and each of the one or more client operating systems includes a virtual window manager (VWM) client to switch the application to a foreground in response to a request from the VWM server.

The server operating system may manage domain role information and may further include a VWS configuration manager (VCM) server, the server operating system and each of the one or more client operating systems may further include a VCM client which sets the corresponding operating system as a main domain or a sub-domain according to the domain role information of the VCM server, wherein only one of the operating systems is set as the main domain and the other operating systems are set as the sub-domains, a first operating system that is set as the main domain may provide an integrated graphic user interface that includes information about applications executable on the plurality of operating systems, and the first operating system may receive the application execution request, and a second operating system that is set as the sub-domain may provide the main domain with application information.

When receiving a request for executing an application corresponding to one of application information provided through the integrated graphic user interface from the first operating system, the VWM server may switch an operating system in which the requested application exists to a foreground, and a VWM client included in the operating system in which the requested application exists may switch the application to a foreground in response to a request from the VWM server.

Each of the operating systems may include a device driver to support direct access to a graphic device included in the hardware, and the operating system switched to the foreground may output graphic data of the application switched to the foreground to the graphic device through a device driver included in the operating system in which the application is present.

The VWM server may manage a window stack that indicates how windows overlay one another on the display, the windows displaying operations of applications executable on the plurality of operating systems.

Each of the operating systems may further comprise a graphic user interface providing is unit configured to display an operation status of the operating system.

The graphic user interface providing unit of the first operating system set as the main domain may configure a graphic user interface to display application information in an integrated fashion in a single window using the application information about applications executable in the main domain and/or applications executable in the sub-domain, according to a user input.

The graphic user interface providing unit of the first operating system set as the main domain may configure the graphic user interface to display information of each domain in which the respective applications exist.

The graphic user interface providing unit of the second operating system set as the sub-domain may include a window manager that manages a window stack indicating how windows overlay one another on the display, the windows displaying operations of all applications running on the sub domain, and the VWM client may control a window to be displayed at a foreground window where the window displays an application which is requested to be executed as a foreground.

The first operating system set as the main domain may further include a software registration manager (SRM)_main to receive information of an application executable on the first operating system and application information provided from the second operating system and to provide the received information to the graphic user interface providing unit, and the second operating system set as the sub-domain may further include an SRM_sub to transmit to the SRM_main application information of an application executable on the second operating system.

The SRM_sub may install a new application in response to a request from the SRM_main which has received an installation request of an application from a user, and may transmit application information of the newly installed application to the SRM_main such that the application information can be added to the integrated graphic user interface.

The first operating system set as the main domain may further include an application runtime manager (ARM)_main to manage execution of an application provided through the graphic user interface, and the second operating system set as the sub-domain further includes an ARM_sub to manage execution of an application installed in the second operating system.

When an application execution request is received through the graphic user interface, the ARM_main may identify an operating system in which the requested application exists, and when the requested application is present in the second operating system, the ARM_main may request the ARM_sub of the second operating system to execute the application.

The second operating system set as the sub-domain may include an event agent (EA)_sub to manage events on the operating system, including start and termination of an application, and the EA_sub may request the VWM server to switch an application which is executable on the second operating system to a foreground.

The server operating system may further include a VWS alive manager (VAM) server to monitor an operational status of a virtual window system service that provides the integrated graphic user interface, and the server operating system and each of the one or more client operating systems may include a VAM client to monitor an operational status of each virtual window system service.

The first operating system set as the main domain may further include a task manager configured to manage tasks of applications executed on the plurality of operating systems.

The first operating system set as the main domain may include an EA_main to manage events occurring in the plurality of operating systems and a configuration synchronizer (CS)_main to manage settings of the plurality of operating systems, and the second operating system may include an EA_sub to provide the EA_main with information of an event occurring on the sub-domain and a CS_sub to provide the CS_main with information of settings of the sub-domain.

In another aspect, there is provided a method of operating a virtual apparatus which includes a hardware, a display, a virtual machine monitor configured to support the hardware such that the hardware has a plurality of operating systems running thereon, and a plurality of operating systems that include a server operating system and one or more client operating system, the method comprising providing an integrated graphic user interface with respect to applications executable on the plurality of operating systems from a first operating system which is set as a main domain, and providing application information to the main domain from a second operating system which is set as a sub-domain such that the main domain can provide the integrated graphic user interface, when receiving a request for executing an application corresponding to one of application information provided through the integrated graphic user interface, switching, at the server operating system, an operating system in which the requested application is present to a foreground, and switching, at the operating system in which the requested application exists, the requested application to a foreground application and providing the foreground application.

The method may further comprise changing settings of the main domain and the sub-domain according to a user input signal.

The providing of the integrated graphic user interface with respect to applications executable on the plurality of operating systems may include configuring a graphic user interface to display application information executable in the first operating system and the second operating system in an integrated fashion in a single window using the application information of applications executable on the first operating system set as the main domain and the application information provided from the second operating system set as the sub-domain.

Other features and aspects may be apparent from the following description, the drawings, and the claims.

BRIEF DESCRIPTION OF THE DRAWINGS

FIG. 4 is a flowchart illustrating an example of a method of initializing a VWS that supports an integrated UI for heterogeneous operating systems.

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
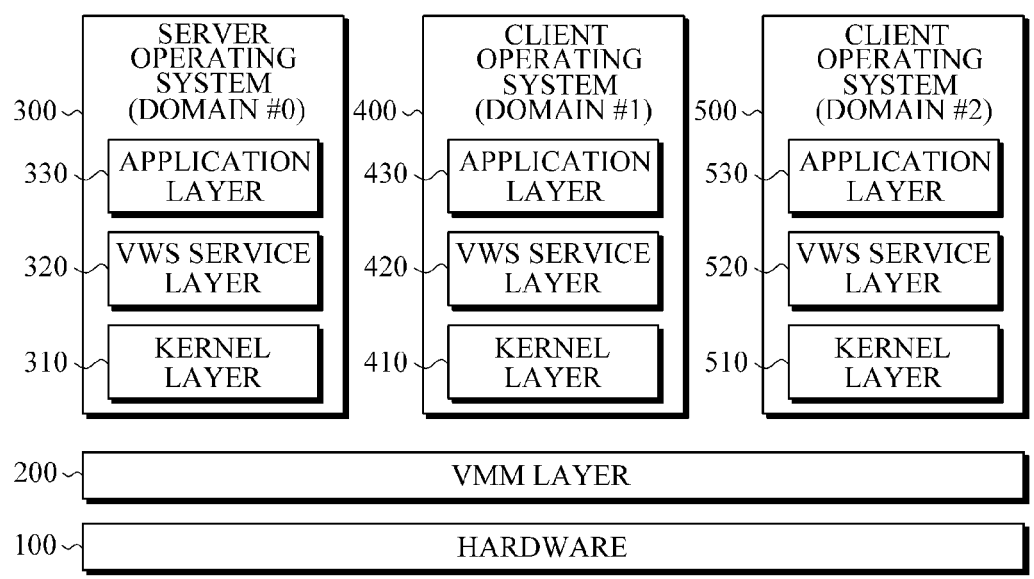
FIG. 1 is a diagram illustrating an example of a virtualization apparatus that supports a plurality of operating systems.

FIG. 1 illustrates an example of a virtualization apparatus that supports a plurality of operating systems.

Referring to FIG. 1, the virtualization apparatus may support a plurality of operating systems, for example, operating systems 300, 400, and 500. This allows hardware 100 to support a plurality of operating executing environments. The system architecture may be a device based on a virtual machine monitor (VMM) layer 200, as shown in FIG. 1. The operating systems 300, 400, and 500 may be different from one another, or two or more of the operating systems may be the same. The VMM layer 200 may provide an inter-domain communication (IDC) channel through which the numerous domains on the VMM may communicate with each other.

The IDC channel may provide a more secure channel than an open network. The VMM layer 200 may include software, for example, Xen, Hypervisor, L4, and the like.

In the example shown in FIG. 1, the plurality of operating systems include a server operating system 300 and two client operating systems 400 and 500. The operating systems shown in FIG. 1 are merely for purposes of example, and it should be understood that any number and type of operating systems may be included. The apparatus that supports the plurality of operating systems 300, 400, and 500 may be implemented as a terminal, for example, a network computer, a personal computer, a mobile phone, a mobile Internet device (MID), a is digital television, a personal digital assistant (PDA), an ultra mobile PC (UMPC), and the like. The type and form of the apparatus are not limited to these examples.

As a non-exhaustive illustration only, the terminal described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, and devices such as a desktop PC, a high definition television (HDTV), an optical disc player, a setup box, and the like capable of wireless communication or network communication consistent with that disclosed herein.

In one example, the operating systems 300, 400, and 500 may use a single hardware device 100, but they run as if they are installed on multiple hardware devices. Accordingly, a single hardware device may support a plurality of operating systems, for example, two operating systems, three operating systems, four operating systems, or more. The number of operating systems (or domains) that may run on a single system is not limited thereto.

As described herein, the term "domain" refers to an environment where each operating system runs. In addition, a "domain application" refers to an application which exists and runs on a predetermined operating system or domain where the operating system runs. For example, a domain #1 application may be an application that exists and runs in an operating system #1.

Referring to FIG. 1, an operating system may be operated as a server operating system such as operating system 300. The server operating system 300 controls the other operating systems 400 and 500, and is referred to as a "control domain." Furthermore, a domain which includes a device driver for controlling various hardware, such as network devices and output devices, may be referred to as a "driver domain." The control domain may be the same or may is be a different domain as the driver domain. For convenience, the following description is made under the presumption that the control domain is the same as the driver domain, although embodiments are not so limited.

The server operating system 300 and the client operating systems 400 and 500 may provide an integrated user interface for applications running thereon. For example, the server operating system 300 and the client operating systems 400 and 500 may provide an integrated graphic user interface (GUI) for applications that run on the operating systems 300, 400, and 500, using their graphic user interfaces. The server operating system 300 and the client operating systems 400 and 500 may provide icons that indicate an application. The icons of the plurality of operating systems 300, 400, and 500 may be provided on a single window as an integrated GUI. That is, the available applications on each of the operating systems 300, 400, 500, may be displayed on a single window using an integrated GUI.

Accordingly, the apparatus that supports the plurality of operating systems 300, 400, and 500 may use the GUIs to provide an integrated GUI for applications which are operated in other operating systems. Hereinafter, an operating system (or a domain) that provides an integrated user interface is referred to as a "main domain" and the other operating systems are referred to as "sub-domains."

A main domain may integrate application icons of all the domains of the apparatus, and display the icons to a user. The main domain may provide a function for performing general functions, for example, software installation/removal, task management, and the like. Any operating system may be set as a main domain. The setting of the role of the domain may be dynamically set and changed by a user. For example, any of operating systems 300, 400, and 500 may be set to function as the main domain and any may be set as a sub domain. For example, if the main domain is set to domain 400, domains 300 and 500 may be set as the sub-domains. The main domain generates the integrated GUI interface to be displayed on a display of the apparatus using information of applications executable on the main domain and applications executable on the sub-domains.

A sub-domain may provide the main domain with local domain application information of the sub-domain. The application information of the sub-domain is information that the main domain may use to provide integrated GUI. Additionally, the sub-domain may be a passive domain that performs various operations, for example, application installation/removal, application execution/termination, foreground application switch, provision of process and GUI application information that are currently running, and the like. The passive domain may perform operations in response to a request from the main domain.

For example, in a system that uses both a WINDOWS MOBILE® operating system and an ANDROID® operating system, if a user prefers an ANDROID® screen and sets ANDROID® as a main domain, a system may be operated under the ANDROID® environment by default, except when a WINDOWS MOBILE® application is run, so that a user preferred screen (i.e., ANDROID® screen) may be displayed as long as possible. The WINDOWS MOBILE® may be set as a main domain according to user selection. WINDOWS MOBILE® and ANDROID® are examples of operating systems that are designed for mobile terminals, such as cellular phones. Trademarks used herein are the property of their respective owners.

In an operating system that is set as a main domain, components that enable main domain functions may only be operated, and in an operating system that is set as a sub-domain, components that enable sub-domain functions may only be operated.

Alternatively, in some embodiments, each of the operating systems 300, 400, and 500 may operate components that enable main domain functions and sub-domain functions. An operating system that is set as a main domain may integrate application icons of all domains and display the integrated application icons to a user. An operating system set as a sub-domain may provide the main domain with information of applications of its local domain while components for functioning as a main domain are being operated therein. Accordingly, when a main domain is switched in response to a user request, an instant switch of the operating system set as a sub-domain to a main domain is possible because the operating system has already acquired information of applications of the other domains and generated icon information in accordance with its own GUI.

As shown in FIG. 1, the operating systems 300, 400, and 500 may include kernel layers 310, 410, and 510, virtual window system (VWS) service layers 320, 420, and 520, and applications layers 330, 430, and 530, respectively. Each of the kernel layers 310, 410, and 510 may enable the corresponding operating system 300, 400, and 500 to communicate with the other operating systems. The VWS service layers 320, 420, and 520 and the application layers 330, 430, and 530 may be used to provide a coherent and integrated user interface.

As described in the above example shown in FIG. 1, a driver domain, for example, the server operating system 300, may directly control human interface device (HID) hardware. HID hardware is a user interface device for a direct interaction with a human user, which provides an output to the human user in response to an input from the human user. Non-limiting examples of the HID hardware include a keyboard, a mouse, a trackball, a touch pad, a graphic tablet, a joystick, a video (graphic) output device, and the like. Other client operating systems, for example, the client operating system 400 may be connected with the server operating system 300 over a network or through inter-domain communication. The client operating systems may issue a request for use of the HID. This method is referred to as a "split driver scheme."

In one example, each of the client operating systems 400 and 500, as well as the server is operating system 300, may include an HID device driver for direct access to the HID. Accordingly, if an application that a user desires exists in a domain #1 (reference numeral 400 in FIG. 1), the domain #1 400 may become a foreground so that the domain #1 400 may transfer graphic data directly to a graphic hardware device using its own HID device driver. If a user changes the foreground from the domain #1 400 to a domain #2 500, the domain #2 500 may directly transfer graphic data to the graphic hardware using its own HID device driver.

The above-described foreground switching scheme may improve data transmission performance because graphic data may be directly transferred to the graphic hardware from the foreground, whereas in the split driver scheme graphic information of each domain is transferred to graphic hardware via a driver domain. The "foreground" or "foreground domain" refers to an application of an operating system that is being displayed on the integrated GUI that is generated by the main domain. When the application is displayed, the HID device driver of the operating system or a domain in which the application exists occupies and uses an HID.

An operation in which the an operating system uses its own GUIs to provide an integrated GUI for the applications running on the other operating systems is referred to as a "virtual window system (VWS) service function." When performing the VWS service function, the operating system may provide an application execution screen to a user by switching a current foreground to another domain in which an application that the user desires exists, according to a foreground switching scheme.

If the VWS service function is deactivated, and the user desires to execute an application that is on an operating system different from the foreground domain, identification of a domain where the desired application exists may be desired. Accordingly, the domain where the desired application exists may be switched to a foreground domain manually, and execution of the desired application may be operated in the switched foreground domain. An execution is mode where the VWS service function is deactivated is referred to as a "manual switch mode."

Figure 2:
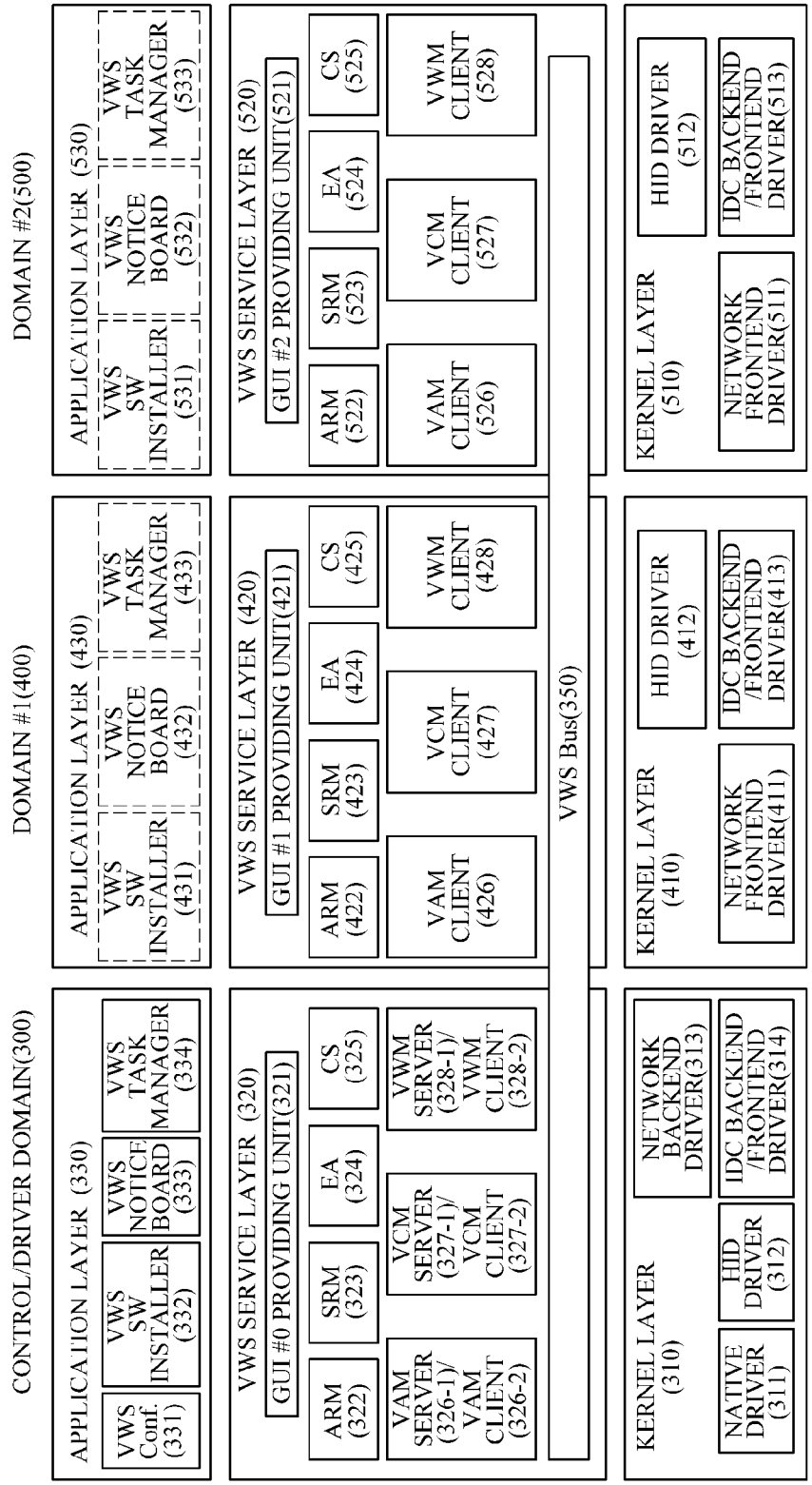
FIG. 2 is a diagram illustrating an example of a server operating system and client operating systems.

FIG. 2 illustrates an example of a server operating system and client operating systems.

Referring to FIG. 2, server operating system 300 is a control domain. The control domain may be set as a main domain or a sub-domain. The server operating system 300 is include an application layer 330 that may include a VWS configuring unit 331, a VWS software (SW) installer 332, a VWS notice board 333, and a VWS task manager 334.

The VWS configuring unit 331 is an application that provides a graphic user interface (GUI) to enable a user to control various settings related to a VWS function. The VWS configuring unit 331 may be configured to enable the user to choose a main domain from among domains operated on a current system. The VWS configuring unit 331 may provide an interface that activates and deactivates the VWS service function. The VWS configuring unit 331 may be operated in the control domain 300.

The VWS SW installer 332 is an application that installs various software in any domain regardless of the type of domain. The VWS SW installer 332 controls an interface with the user. However, the actual installation process is controlled by a software registration manager 323. The VWS SW installer 332 is operated in the main domain 300.

The VWS notice board 333 may be a board that provides information of events occurring in an operating system. The VWS notice board 333 may be, for example, a notification bar of an ANDROID® operating system, a status bar of a WINDOWS MOBILE® operating system, and the like. The VWS notice board 333, in association with an event agent (EA) 324 and a configuration synchronizer (CS) 325, may provide information to a user, synchronize information between domains on the same system, and display information between the domains. The VWS notice board 333 may be operated in each of domains 300, 400, and 500 where the same information is desired to be displayed. The VWS notice board in each domain may is constantly display information while a user is using an application on the sub-domain or the main domain.

The VWS task manager 334 may be an application that integrates information of processes and/or GUI applications which are operated in all domains on the system. The VWS task manager 334 may provide the integrated information to the user and receive a user request with respect to the processes and/or GUI applications. The VWS task manager 334 may provide information of a domain where a corresponding application exists, in addition to the integrated information. The user may terminate the use of software and switch the foreground software using the VWS task manager 334. The VWS task manager 334 may be operated in the main domain 300.

In the conventional art, when a plurality of operating systems are operated in a single system and tasks (or processes) running on the respective operating systems need to be managed (for example, foreground switch, termination, information display, priority change, and the like), the corresponding domain should be switched to a foreground to manage the desired task. Conversely, the VWS task manager 334 running on the main domain 300 may provide the convenient integrated management for all domains, when a user requests execution of an application that is executable only on a sub-domain.

The VWS service layer 320 may include a GUI #0 providing unit 321, an application runtime manager (ARM) 322, a software registration manager (SRM) 323, an EA 324, a CS 325, a VWS alive manager (VAM) server 326-1 and a VAM client 326-2, a VWS configuration manager (VCM) server 327-1 and a VCM client 327-2, and a virtual window manager (VWM) server 328-1 and a VWM client 328-2.

The VAM server 326-1, the VCM server 327-1, and the VWM server 328-1 may be operated in the control domain (or a driver domain). The control domain 300 and the other is domains 400 and 500 may also include VAM clients 326-2, 426, and 526, VCM clients 327-2, 427, and 527, and VWM clients 328-2, 428, and 528, respectively.

In this example where control domain 300 is set as the main domain and client domains 400 and 500 are set as sub domains, the ARM 322, the SRM 323, the EA 324, and the CS 325 may be operated in the main domain 300 and are referred to as main components. The ARMs 422 and 522, SRMs 423 and 523, EAs 424 and 524, and CSes 426 and 526 may be operated in the respective sub-domains 400 and 500, and are referred to as sub components. The configuration of the components in the respective domains may be expanded and modified in various ways.

The GUI #0 providing unit 321 may provide a graphic user interface according to the operating system of the main domain 300. The GUI #0 321 may configure a graphic user interface and provide integrated information of applications that are available in the main domain 300 and the sub-domains 400 and 500. The integrated information may include information of an application running on the main domain 300 and application information provided from the respective sub-domains 400 and 500.

For convenience of explanation, the ending "_main" is attached to the main components in the main domain 300, and the ending "_sub" is attached to each of the sub components in the sub domains 400 and 500.

The ARM_main 322 may manage the execution and operation of an application. For example, if a user executes an application proxy, for example, by clicking an icon corresponding to an application, the application proxy may issue a request to the ARM_main 322 for executing an actual application in the sub-domain 400 that is connected to the application proxy. The ARM_main 322 may receive information (for example, information of a domain where the application exists, and the location of an execution file) which may be used to execute the application from the application proxy.

Accordingly, the ARM_main 322 may request the ARM 422 of the sub-domain 400 to execute the application based on the received information. In addition, the ARM_main 322, in association with the ARM_subs 422 and 522 of the respective sub-domains 400 and 500, may provide and process the GUI application information of all domains to the VWS task manager 334. Also, the ARM_main 322 may perform an operation related to the application runtime, for example, a switch of a foreground application.

The SRM_main 323 may install or remove software, receive information of an application from each of the SRM_subs 423 and 523, and generate an application proxy connected to the corresponding application in the main domain 300. In response to the application proxy being executed in the main domain 300, the application in the sub-domain connected to the application proxy may be executed by the operation of the ARM_main 322.

There may be various methods to determine in which domain software is installed using the SRM_main 323. For example, if domain A is a safe domain in which authenticated software is installed, and any software can be installed and run in other domains without restriction, software may be installed in the domain A where the software has been already authenticated. Otherwise, the software may be installed in another domain. If software is to be installed in the sub-domain 400 or removed from the sub-domain 400, a request for installation or removal may be issued to the subordinate software registration manager (SRM_sub) 423 running on the sub-domain 400 so that the application can be installed or removed.

The SRM_main 323 may receive information of an application executed in the main domain 300 and application information from at least one sub-domain, and may provide the received information to the GUI #0 providing unit 321. The GUI #0 providing unit 321 of the main domain 300 may configure a GUI to display information of applications executed in numerous domains in an integrated and consistent manner.

The EA_main 324 may provide information of various events of the operating system. For example, the EA_main 324 may provide the start/termination of an application, occurrence of a pop-up window, ANDROID® Intent, and the like, to a relevant and proper domain based on the type of event that has occurred. In addition, the EA_main 324 may receive an event from another domain, and transfer the event to a corresponding component to process the event. When events occur in the respective domains, the events synchronized between the domains may be provided using the EA_main 324. For example, for an event such as receiving an Internet call, a user may be informed of the event by displaying, for example, a pop-up window in a foreground domain even when the Internet call application is being executed in a background domain.

The CS_main 325 may synchronize various settings between the domains, for example, backlight, power management, and the like, which may affect the overall system. The CS_main 325 may integrate environment settings of different domains by synchronizing the backlight, battery settings, and the like, and display the integrated settings to the user in a consistent manner.

The VAM server 326-1, located in the control domain 300, may receive information about the operational statuses of VWS service functions of the respective domains 300, 400, and 500. In response to the VWS service function of the main domain 300 being deactivated, the VAM server 326-1 may broadcast the status of the VWS service function to sub-domains 400 and 500, and drive the sub-domains 400 and 500 to perform appropriate operations in response to the deactivation. For example, the sub-domains 400 and 500 may stop VWS service-related operations in response to a stop notice for the VWS service function of the main domain 300, and allow the user to switch domains manually. In response to the VWS service function of the sub-domain 400 being deactivated, the VAM client 426 may notify the main domain 300 of the stopping of the VWS service, thereby enabling the main domain 300 to perform an appropriate operation.

The VCM server 327-1 may store and manage information of VWS service function, on/off status, and domain role information, which are used by each domain to function as a main domain or a sub-domain. As described herein, the phrase "domain role" refers to whether the domain is a main domain or a sub-domain. The VCM server 327-1 may provide the stored information (for example, the domain role information) to the corresponding domain. The VCM server 327-1 may provide domain role information to the operating systems 300, 400, and 500 such that each of the operating systems 300, 400, and 500 may function internally as a main domain that is capable of providing an integrated GUI for applications executed in each of the domains.

The VWM server 328-1 may manage a window stack that indicates how windows overlay one another. The windows may display operations of applications of all domains 300, 400, and 500. That is, the VWM server 328-1 may determine which applications are to be currently displayed in the foreground. For example, in response to the VWM server 328-1 receiving a request for switching an application to a foreground from a VWS component, for example, the ARM_main 322 or the EA_main 324, the VWM server 328-1 may issue the application switch request to a VWM client of a domain where the requested application exists. Accordingly, the corresponding domain may be switched to the foreground.

The VWM server 328-1 may ignore a request for switching to a foreground window of an application window that has a lower priority than a current foreground application. In addition, the VWM server 328-1 may provide a function to run software in response to an input from a particular screen region or a particular hardware button, regardless of a foreground domain. This function may be used to display a home screen of the main domain 300 when a user presses a particular screen region or a particular hardware button.

The kernel layer 310 may include a native driver 311, an HID driver 312, a network backend driver 313, and an IDC backend/frontend driver 314. The native driver 311 may be used for access to various hardware components. The HID driver 312 may be used for direct access to an HID device. The network backend driver 313 may provide network communication between domains. The IDC backend/frontend driver 314 may provide communication between domains through the communication channel provided by the VMM layer 200 (shown in FIG. 1). The IDC may be operated in the VMM layer 200, and may provide a safer communication channel than a network that is used for communications between the domains.

The configuration of the operating system 400 as a sub-domain is described below. The VWS SW installer 431 and the VWS task manager 433, which are illustrated with dotted lines in the application layer 430 in the example shown in FIG. 2, may be installed and used in the application layer 430 when the operating system 400 is subsequently set as a main domain.

The VWS service layer 420 may include a GUI #1 providing unit 421, the ARM_sub 422, the SRM_sub 423, the EA_sub 424, and the CS_sub 425. The GUI #1 providing unit 421 may provide a GUI according to an operating system of the sub-domain 400. The ARM_sub 422 may manage the execution of applications installed in the sub-domain 400. The ARM_sub 422 may execute an application in response to an application execution request from the ARM_main 322.

The SRM_sub 423 may enable the operating system 400 to install/remove software therein/therefrom in response to a software installation/removal request received from the SRM_sub 323. Furthermore, the SRM_sub 423 may transmit information of applications that are installable and executable in the operating system 400, to the SRM_sub 323.

The EA_sub 424 may transmit various events of the operating system, for example, application start/termination, the occurrence of a pop-up window, ANDROID® Intent, and the like, to suitable domains according to the type of event. Additionally, the EA_sub 424 may provide the EA_main 324 with information of events that occur in the sub-domain 400.

The CS_sub 425 may synchronize various settings, such as backlight and power management, which may affect the overall system, between domains. The CS_sub 425 may provide the CS_main 325 with information of settings of the sub-domain 400, and may relay information that the user has set to the sub-domain 400. The provided settings information may allow all domains to maintain the settings consistently.

The VAM client 426 may monitor the status of each VWS component of a local domain, and report the status to the VAM server 326-1. The VAM client 426 may perform an appropriate operation in response to receiving a stop notice regarding a VWS operation of another domain.

The VCM client 427 may reset a configuration according to domain role information received from the VCM server 327-1. Accordingly, the operating system 300 that is set as a main domain may provide an integrated user interface and an operating system in which an application requested to be executed as a foreground application exists may be switched to a foreground. For example, the VCM client 427 may receive domain role information (or VWS service function setting information) from the VCM server 326, and set the ARM 422, the SRM 423, the EA 424, and the CS 425 to perform operations as main components and/or sub components, based on the domain role information. In addition, in response to the VWS service function settings being changed, the VCM client 427 may control each component to operate in accordance with the changed settings.

The VWS components 321 through 328, 421 through 428, and 521 through 528 included in the respective VWS service layers 320, 420, and 520, may communicate by default with other components using the VWS bus 350. The VWS bus 350 may support the communications between the components using the same method, regardless of whether the components that are communicating are present in the same domain or in different domains, or whether the components communicate through a network or an IDC. In some embodiments, the components may use their own communication channel to communicate.

The kernel layer 410 may include a network frontend driver 411, an HID driver 412, and an IDC backend/frontend driver 413. The network frontend driver 411 may provide network communication between the domains. The HID driver 412 may be used by the operating system 400 to directly access an HID device. The IDC backend/frontend driver 413 may provide communication between the domains through the communication channel provided by the VMM layer 320.

Figure 3A:
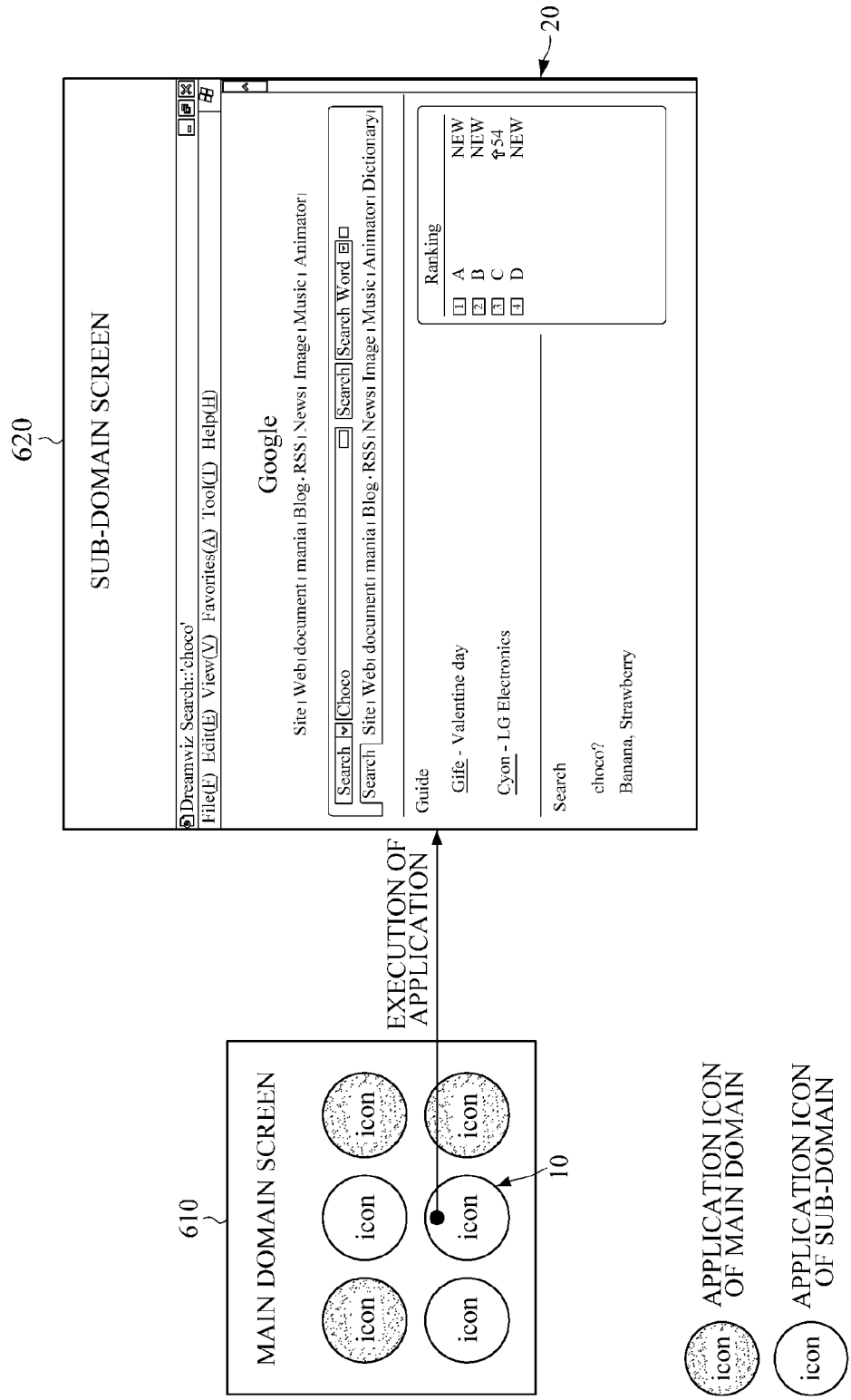
FIGS. 3A and 3B are diagrams illustrating examples of displays in which an example user interface is provided.
Figure 3B:
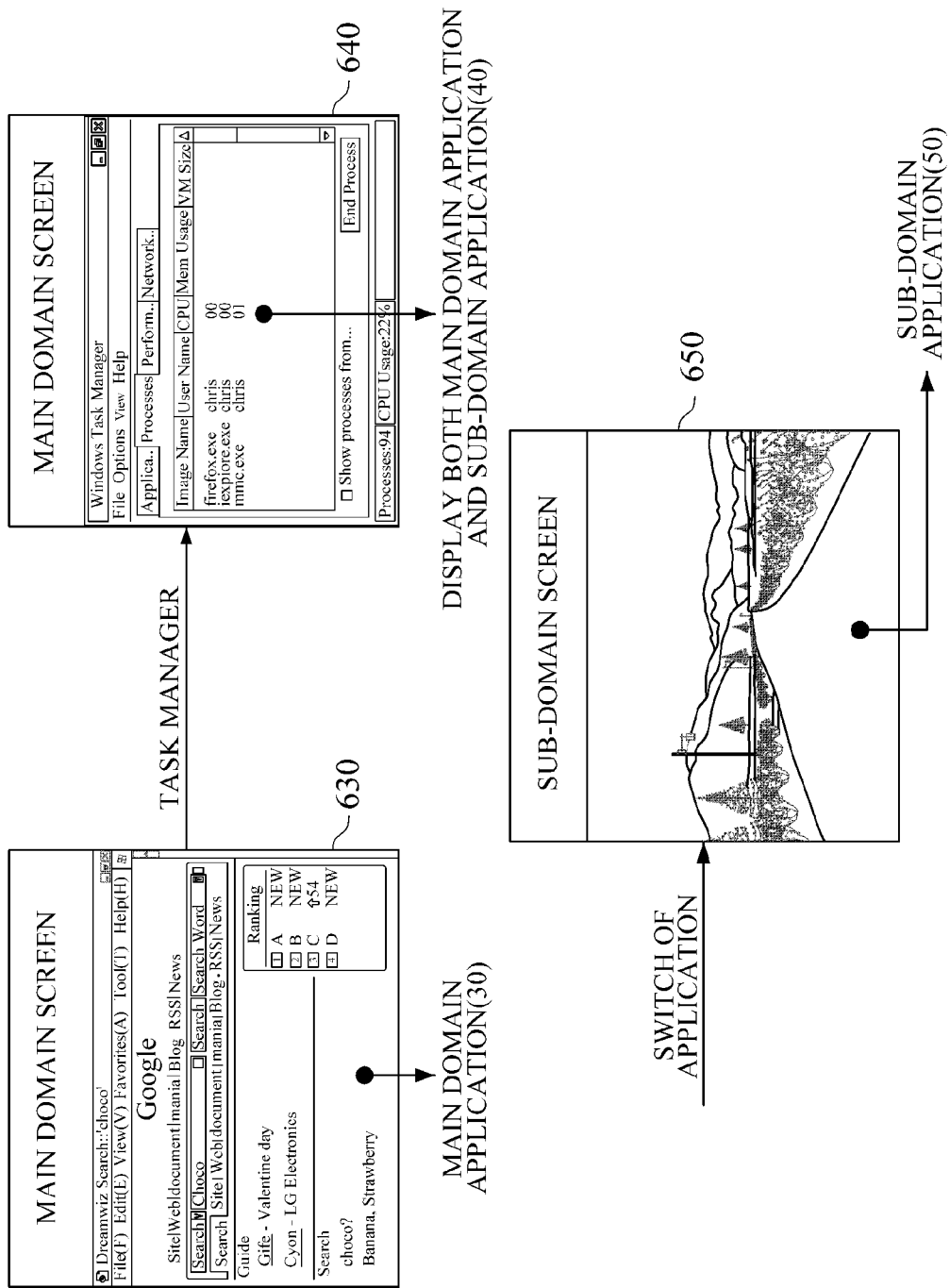

FIGS. 3A and 3B illustrate examples of displays in which an example user interface is provided.

FIG. 3A illustrates an example display where an application from a different sub-domain is executed on the main domain. Referring to FIG. 3A, application icons of a current foreground domain and icons of one or more other sub-domains that operate in the background may be displayed together as an integrated GUI. In addition, although not shown, information informing in which domain each application exists may be displayed along with the icons. In one example, the control domain 300 may be set as a main domain.

Referring to FIGS. 2 and 3A, screen 610 may display application icons of the main domain 300 and also display application icons of the sub-domains 400 and 500. The screen 610 may provide icons of applications that are executable in the respective domains 300, 400, and 500. In response to a user selecting an application provided through the GUI, for example, icon 10, an application corresponding to the icon 10 may be executed. If the application corresponding to the icon 10 exists in a sub-domain 400, the application of sub-domain 400 may be switched to a foreground as shown in the screen 620, and an execution screen 20 for the application corresponding to the icon 10 may be provided in the sub-domain 400.

Accordingly, the main domain 300 may integrally manage applications running in different domains and provide an integrated user interface to a user. The integrated user interface may improve convenience of use when the apparatus includes a plurality of operating systems. As another example of an integrated user interface, icons indicating applications running on a plurality of operating systems may be displayed in a single window, such as a window in a compact mobile device. Accordingly, the integrated user interface may be used in a compact mobile device that has a small screen.

Accordingly, a user does not need to identify in which domain an application to be executed exists and/or which domain is currently operated as a foreground domain. That is, when executing a predetermined application, the user does not need to perform various operations including confirmation of in which domain the application exists, switching the domain where the application exists to a foreground domain, execution of the application using an application list in the switched domain, and the like.

FIG. 3B illustrates an example where an application running in a current domain is switched to another application that is in a different domain. A screen 630 displays an application 30 of the main domain 300 that is running in the main domain 300 as a foreground domain. At this time, in response to a user executing the VWS task manager 334 for managing the running applications, a display 40 of the VWS task manager 334 may show all applications which are present in the sub-domains 400 and 500, as well as in the main domain 300, as shown in a screen 640.

The screen 640 may display a list of applications running in each domain regardless of the number and/or type of the domains currently being executed. Also, the screen 640 may provide information about which domain each of the running applications exists in. In response to the user's selecting an application of the sub-domain to be a foreground application from the display 40 provided by the VWS task manager 334, the sub-domain 400 in which the selected application exists may be automatically switched to a foreground domain, and the application 50, as shown in a screen 650, may be automatically switched to a foreground in the sub-domain 400.

Accordingly, the integrated user interface may enable the user to execute, terminate, and manage an application without identifying in which operating system the application to be executed exists, and in which operating system the executed application is running.

The main domain 300 may provide an integrated user interface with respect to the applications executed in a plurality of operating systems. Under the control of the main domain 300, the sub-domains 400 and 500 may provide user interfaces for applications that exist in the respective sub-domains 400 and 500 in an integrated manner through the main domain 300. Thus, the user interface may be more efficiently provided in an apparatus that supports a plurality of operating systems. That is, an application of a sub-domain 400 running in the background may be executed in the foreground while a main domain 300 is currently running in the foreground. Accordingly, a single window is all that is needed to transfer from an application of a first operating system, to transfer to an application of a second operating system.

An operation method of a virtualization apparatus that switches a foreground screen and provides an integrated user interface is described with reference to FIGS. 4 through 8.

FIG. 4 illustrates an example of a method of initializing a VWS that supports an integrated UI for heterogeneous operating systems. VWS initialization by VWS reset is described below with reference to FIGS. 2 and 4.

Referring to FIGS. 2 and 4, in response to system reset, a bootloader may run the VMM layer 200 in 710. The VMM layer 200 may boot the control/driver domain 300 in 720. If desired, the control/driver domain 300 may boot the sub-domains (or the domain #1 and the domain #2) 400 and 500 in 730. When the booting of the operating systems 300, 400, and 500 is completed, various initialization operations used for providing a VWS function may be performed, and the VCM server 327-1 may be operated.

The VCM server 327-1 may obtain VWS related information such as the roles of the respective domains 300, 400, and 500 from a non-volatile memory, for example, a flash memory, and the like. Each of the VCM clients 327-2, 427, and 527, in the respective domains 300, 400, and 500, may issue a request for VWS setting information to the VCM server 327-1, and may receive the VWS setting information from the VCM server 327-1 in 740. The VWS setting information may include, for example, domain role information, VWS function on/off status information, and the like.

In 750, each of the VCM clients 327-2, 427, and 527 may identify its own domain role using the received information. Operations that are performed by the respective VCM clients 327-2, 427, and 527 may be determined based on the roles of the corresponding domains 300, 400, and 500.

For example, in response to it being determined that the domains 400 and 500 operate as sub-domains, in 760 the VCM clients 427 and 527 of the respective domains 400 and 500 may set the corresponding VWS components 422, 423, 424, and 425, and 522, 523, 524, and 525 to operate as sub components. In addition, in 760 the SRM_subs 422 and 522 may transmit information of applications that are installed in their local domains to the SRM_main 322.

Also, in response to it being determined that the domain 300 operates as a main domain in 750, in 770 the VCM client 327-2 may set the VWS components 322, 323, 324, and 325 to operate as main components. In addition, in 770 the SRM_main 323 may receive information of applications from the SRM_subs 423 and 523, and generate application proxies associated with the applications using the received information.

The SRM_main 323 may control the GUI #0 providing unit 321 to generate an integrated UI display to a user in 780. For example, the UI display may include an icon view display using the applications of the local domain 300 and the application proxies generated in 770 and provide the generated display to a user.

Figure 5:
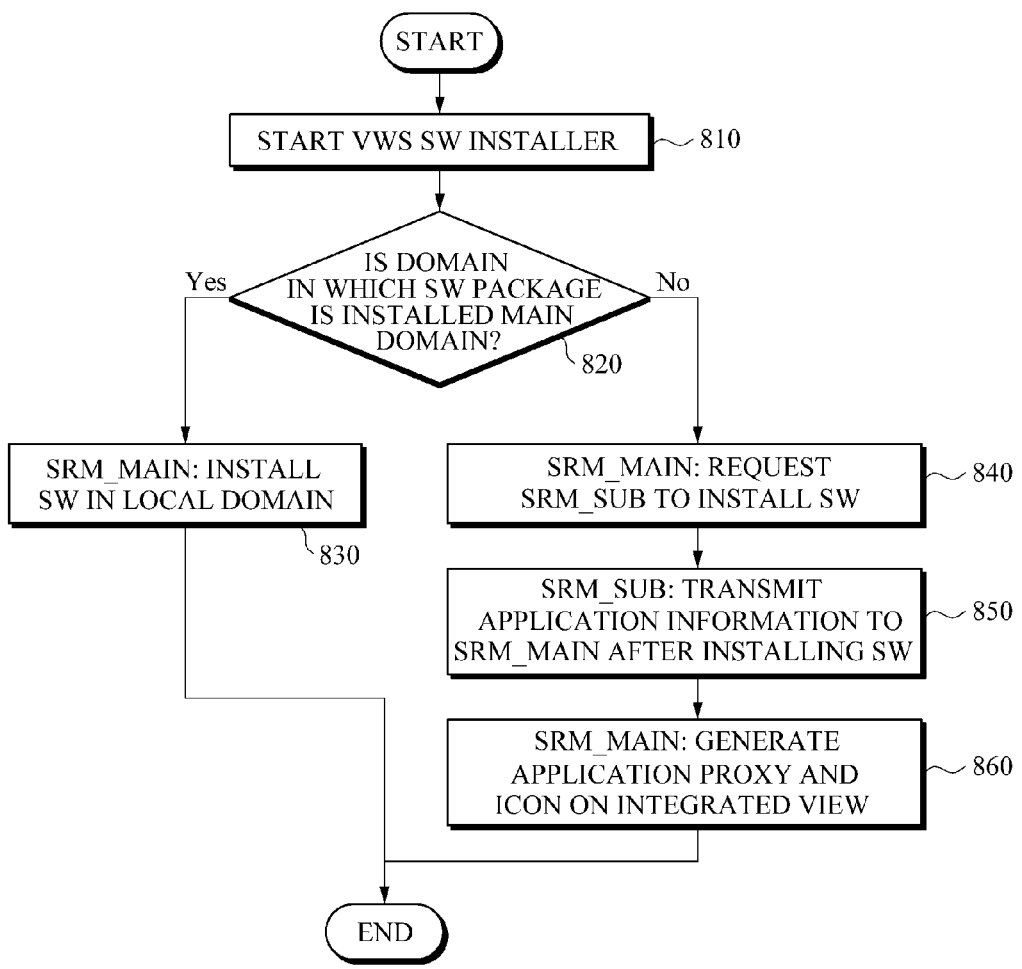
FIG. 5 is a flowchart illustrating an example of a software installation method in a system that uses a VWS.

FIG. 5 illustrates an example of a method of software installation in a system that uses a virtual window system (VWS).

Referring to FIGS. 2 and 5, in 810 the VWS SW installer 332 may begin to run in response to the receipt of a request for software installation from the user. The VWS SW installer 332 may determine whether a corresponding SW package is installed in a main domain or not, in 820.

In response to it being determined that the SW package is installed in the main domain 300, the VWS SW installer 332 may request that the SRM_main 323 install the software, and the SRM_main 323 may install the requested software according to a software installation mechanism of the local domain 300, in 830.

Alternatively, in response to it being determined that the SW package is installed in the sub domain, the VWS SW installer 332 may request that the SRM_main 322 install the software, and the SRM_main 322 may request that the SRM_sub 423 of the domain 400 install the software, in 840.

The SRM_sub 423 may install the software in accordance with its software installation mechanism in response to the receipt of the SW package installation request, and may transmit information of the installed application to the SRM_main 323, in 850.

The SRM_main 323 may generate an application proxy using the received information of the installed application and provides the application proxy to the GUI #0 321. In 860, the GUI #0 may display an icon of an application corresponding to the installed application in an integrated graphic user interface (GUI) that displays application icons of all of the domains in the system. The integrated graphic user interface may be an integrated icon view screen.

The VWS SW installer 332 may determine a domain in which the SW package is to be installed, but also may determine other elements, for example, the SRM_main 323 may determine the domain in various ways.

In the conventional art, in a virtualization environment where various types of operating systems (OS) are present, desired software may be installed in each OS after a user manually changes a domain of a virtualization device from a current domain to a desired domain in which the software is to be installed. In contrast, in the example shown in FIGS. 2 and 5, a user may install software in any domain through the main domain 300 using the VWS SW installer 332, the SRM_main 323, and the SRM_subs 423 and 523.

Figure 6:
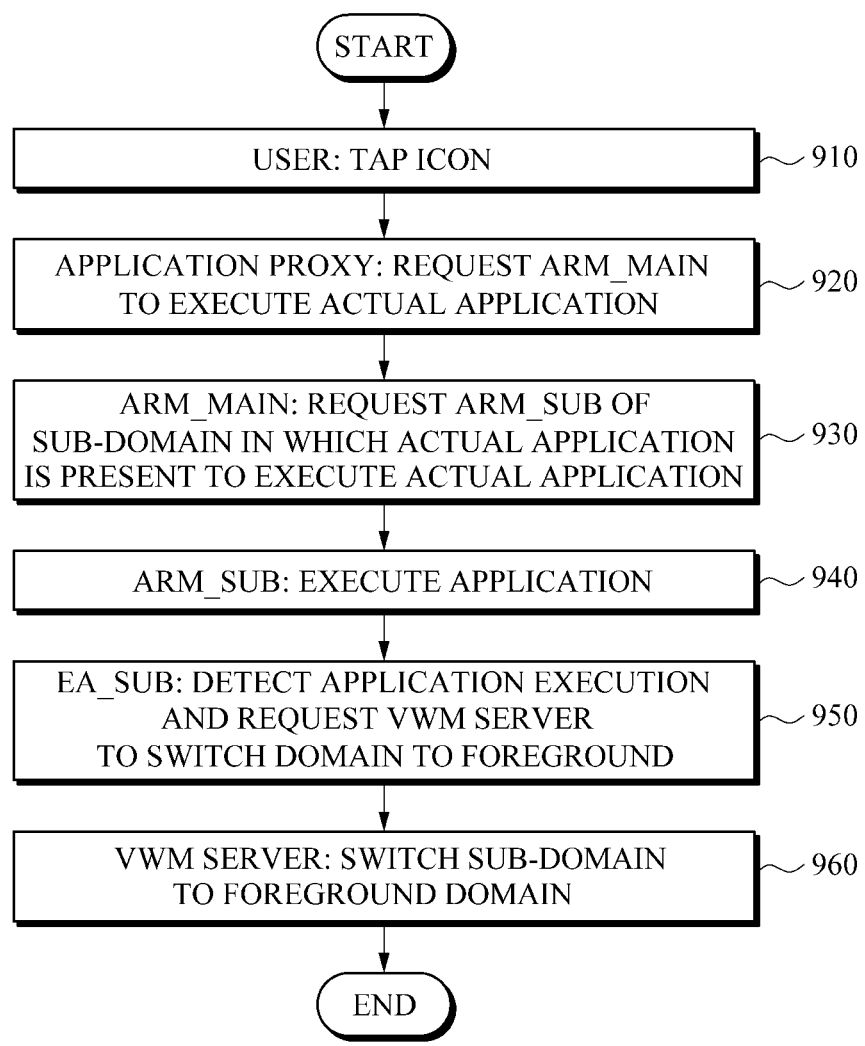
FIG. 6 is a flowchart illustrating an example of a method of executing software that exists in a sub-domain.

FIG. 6 illustrates an example of a method of executing software that exists in a sub-domain.

Referring to FIGS. 2 and 6, while the icons of all domains are integrally displayed in the main domain 300, in 910 a user may tap an icon corresponding to an application that the user desires to execute. The application corresponding to the tapped icon may be an application that exists in the sub-domain 400.

In response to the user's tapping of the icon, in 920, an application proxy corresponding to the icon may be executed, and the application proxy requests the ARM_main 322 to run an actual application linked to the application proxy. The ARM_main 322 may identify a domain in which the application exists based on information of the application, and may requests the ARM_sub 422 of the corresponding sub-domain 400 to execute the actual application, in 930.

In response to the request for executing the application, the ARM_sub 422 may execute the application, in 940.

In 950, the execution of the application may be detected by the EA_sub 424, and the EA_sub 424 may request the VWM server 328-1 through the EA_main 324 to switch a foreground domain to a domain in which the application is executed.

The VWM server 328-1 may switch the domain in which the application is executed to the foreground domain in 960. In addition, the VWM server 328-1 may manage a window stack to display the requested application as the foreground.

Figure 7:
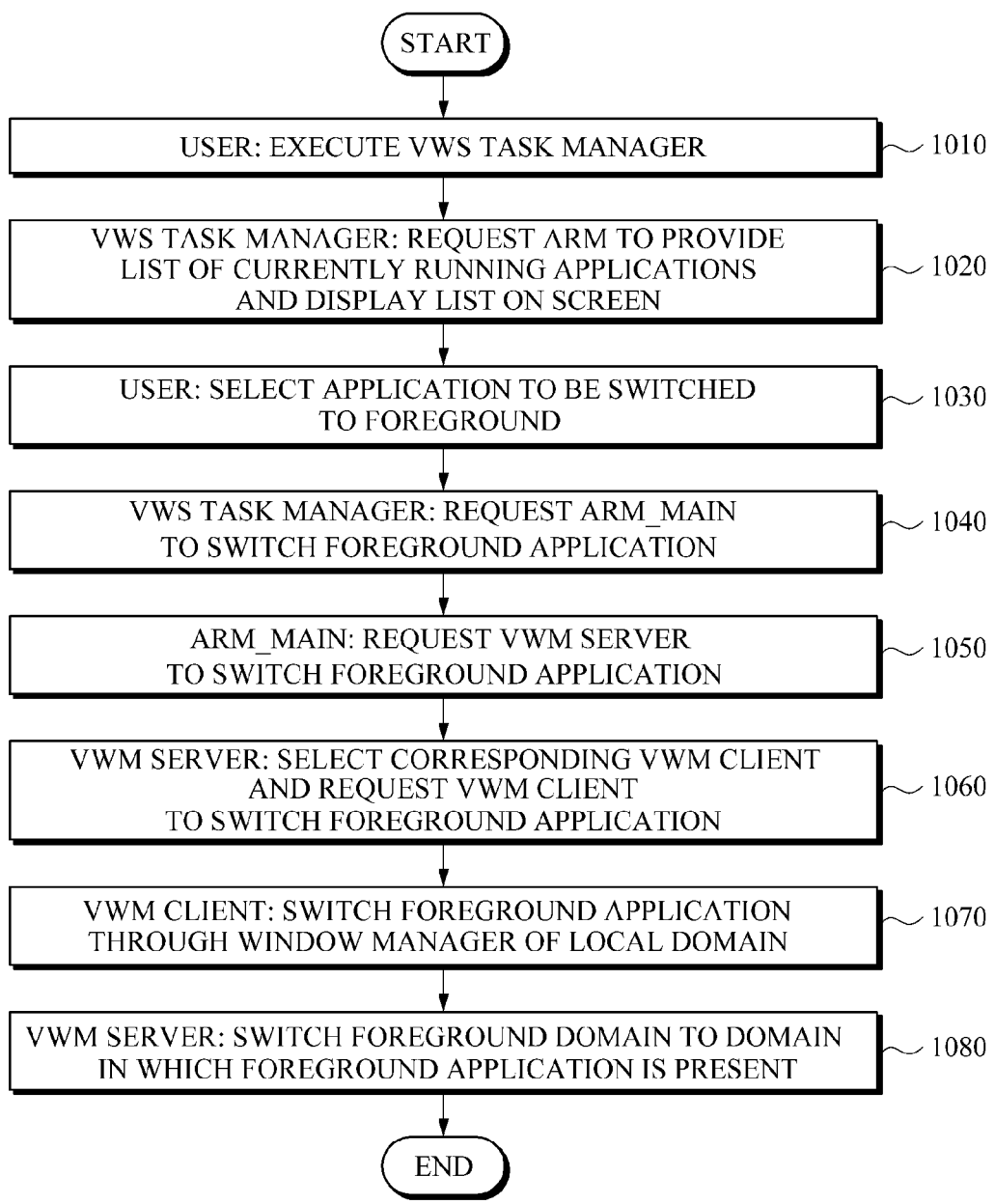
FIG. 7 is a flowchart illustrating an example of a method of switching an application that is currently running as a foreground.

FIG. 7 illustrates an example of a method of switching an application that is currently running as a foreground.

If a user is using an application A and switches the application A to an application B, the application switch may be performed by the example shown in FIG. 7.

Referring to FIGS. 2 and 7, in response to the user's executing the VWS task manager 334, in 1010, the VWS task manager 334 may request the ARM_main 322 to provide a list of applications that are currently running in all domains so as to identify the currently running applications, in 1020. In response, the ARM_main 322 may request each of the ARM_subs 422 and 522 of the sub-domains 400 and 500 to provide application list information. Also, in 1020 the VWS task manager 334 may display a list of applications currently running in all domains based on the application list information received from the ARM_main 322. Accordingly, in operation 1030 the user may select an application from the list so that the application may be switched to the foreground.

In response to the user's selecting an application to be switched to a foreground in operation 1030, the VWS task manager 334 may request that the ARM_main 322 switch the selected application to a foreground, in 1040. In 1050, the ARM_main 322 may request that the VWM server 328-1 perform the foreground application switch.

The VWM server 328-1 may select the VWM client 428 of the domain in which the requested application exists, and request the VWM client 428 to switch the corresponding application to a foreground, in 1060.

In 1070, the VWM client 428 may switch the corresponding application to a foreground using a window manager included in the GUI #1 providing unit 421 of the local domain 400. The VWM server 328-1 may then switch the domain in which the application exists to a foreground domain, in 1080. In one example, the VWS task manager may request the VWM server and the VWM client to perform the foreground application switch, but also any other element may issue the request.

Figure 8:
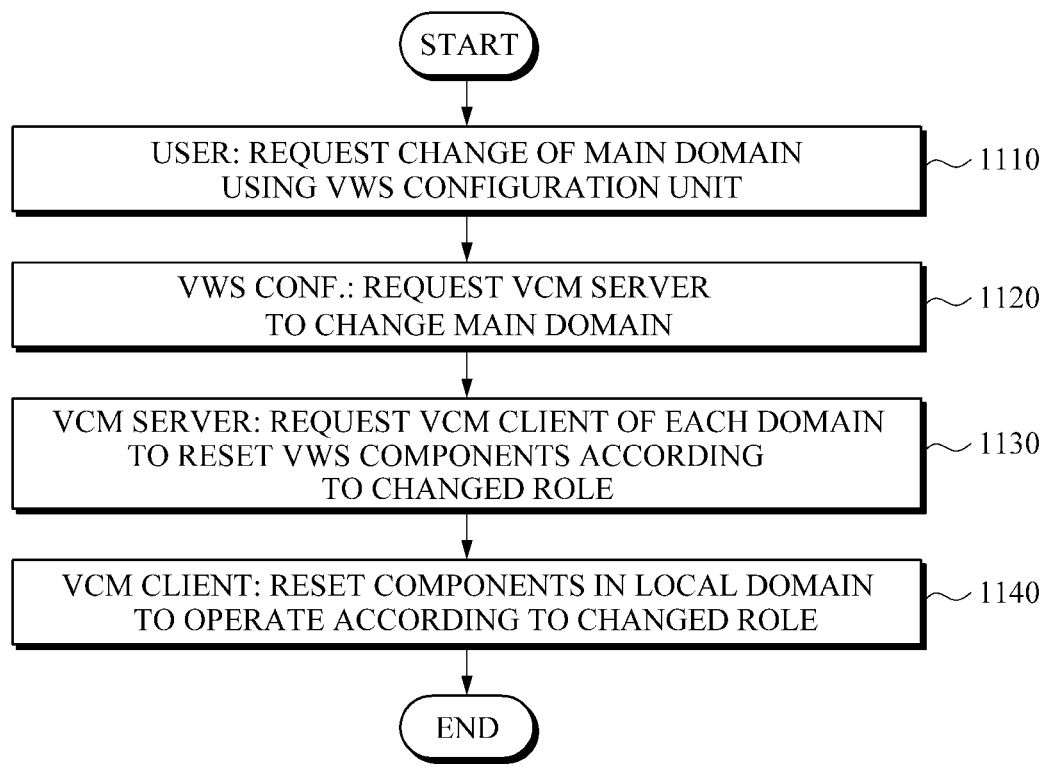
FIG. 8 is a flowchart illustrating an example of a method of changing the main domain from one domain to another domain.

FIG. 8 illustrates an example of a method of changing a domain from one domain to another.

Referring to FIGS. 2 and 8, a user may request a main domain change through the VWS configuring unit 331, in 1110. The VWS configuring unit 331 may request the VCM server 327-1 to change the main domain, in 1120.

In 1130, the VCM server 327-1 may request that the VCM clients 327-2, 427, and 527 of the respective domains 300, 400, and 500 reset the VWS components according to the newly changed functions of the domains. For example, if the main domain is changed to the domain #1 400, the VCM server 327-1 may request that the VCM client 327-2 reset the ARM 322, the SRM 323, the EA 324, and the CS 325 as sub components. In addition, the VCM server 327-1 may request that the VCM client 427 reset the ARM 422, the SRM 423, the EA 424, and the CS 425 as main components, and request that the VCM client 527 reset the ARM 522, the SRM 523, the EA 524, and the CS 525 as sub components. At this time, the VCM server 326 may provide information of the roles of the respective domains.

Subsequently, in 1140 the VCM clients 327-1, 427, and 527, respectively, may reset the ARMs 322, 422, and 522, the SRMs 323, 423, and 523, the EAs 324, 424, and 524, and the CSes 325, 425, and 525 to operate according to the changed roles of the domains.

As described above, in order for the running operating systems 300, 400, and 500 to operate as a main domain or a sub-domain, the operating systems may be configured such that main domain components and sub-domain components are able operate internally in each of the operating systems 300, 400, and 500. In one example, an operating system may set as a sub-domain as a main domain with information about applications locally available on the sub-domain while collecting information of applications that are executable in the operating system set as the main domain and in other sub-domains.

Figure 9:
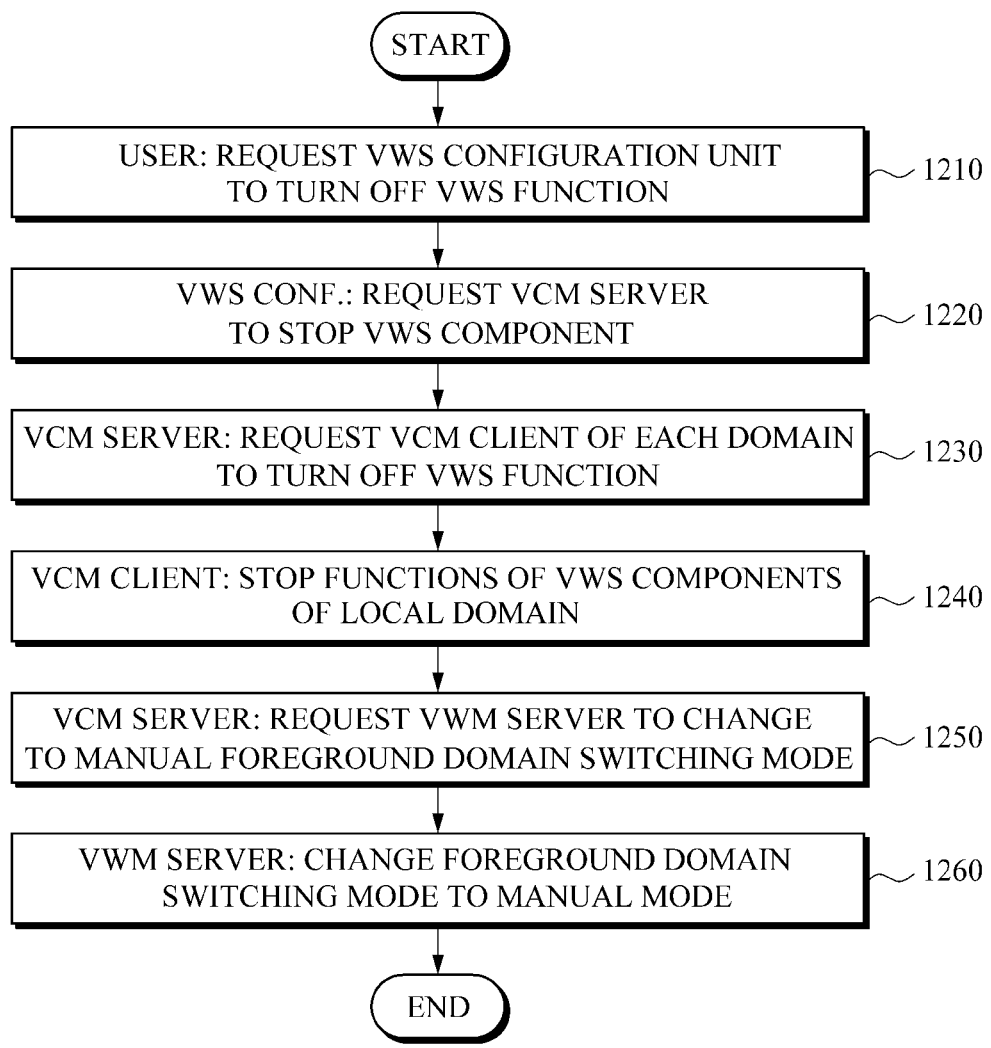
FIG. 9 is a flowchart illustrating an example of a method of turning off a VWS function.

FIG. 9 illustrates an example of a method of turning off a VWS function.

If a user uses a system including a virtualization environment, a screen switch may be performed according to a manual inter-domain switching mode without using the VWS function. In one example, the screen switch between domains may be performed manually by a user while the VWS function is turned off.

Referring to FIGS. 2 and 9, a user may request the VWS configuring unit 331 to turn off the VWS function, in 1210.

The VWS configuring unit 331 may request that the VCM server 327-1 stop operating all VWS components including the ARMs, the SRMs, the EAs and the CSes, in 1220.

The VCM server 327-1 may request that the VCM clients 427 and 527 of the respective sub-domains 400 and 500 turn off the VWS function, in 1230. The respective VCM clients 427 and 527 may stop the functions of the VWS components in their local domain, in 1240.

The VCM server 327-1 may request that the VWM server 328-1 change a current mode to a manual foreground domain switching mode such that the screen switch between the domains may be performed manually by the user, in 1250.

In response to the request from the VCM server 327-1, in 1250, the VWM server 328-1 may stop an automatic inter-domain screen switching function, and may change the current mode to the manual foreground domain switching mode, in 1260.

When execution of an application is requested, an operating system in which the application exists may be automatically switched to a foreground, enabling immediate execution of the application. Additionally, an integrated user interface for a variety of operating systems may be provided to improve convenience of use. For example, the integrated user interface may allow a user to execute, terminate, and manage an application without identifying an operating system in which an application to be executed is located or an operating system in which an application is currently running. Moreover, as an example of the integrated user interface for various operating systems, icons that represent applications running in all operating is systems may be displayed in a single window, and thus the integrated user interface may be suitable for devices such as mobile terminals that have a small display.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It may be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it may be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A virtualization apparatus comprising:
a hardware device comprising at least a processor;
a display;
a virtual machine monitor executing on the hardware device to support execution of operating systems,
wherein the operating systems comprise a server operating system set as a main domain that provides an integrated graphic user interface, and one or more client operating systems set as sub-domain,
wherein the server operating system comprises a virtual window manager (VWM) server configured to, in response to a request for execution of an application in one of the client operating systems, switch the one of the client operating systems comprising the application requested for execution from being in a background to being in a foreground of the integrated graphic user interface, and determine to display both the application requested for execution and a screen configuration of the one of the client operating systems comprising the application requested for execution in the foreground,
wherein the server operating system and each of the client operating systems comprises a virtual window manager (VWM) client configured to switch the application to the foreground in response to the request from the VWM server, and set the corresponding one or more client operating systems as the main domain or sub-domain according to domain role information provided by a virtual window system (VWS) configuration manager (VCM) server in the server operating system, and
wherein the server operating system further comprises a software registration manager (SRM)_main configured to:
receive information of an application executable on the server operating system and application information provided from the one or more client operating systems regarding the application requested for execution, and provide the received information to a graphic user interface providing unit of the server operating system to display operation status of the operating systems.

2. The virtualization apparatus of claim 1, wherein:
the server operating system is configured to manage domain role information through the VCM server; and
only a single operating system of the operating systems is set as the main domain and the other operating systems are set as the sub-domains.

3. The virtualization apparatus of claim 2, wherein:
in response to receiving the request for execution of the application corresponding to application information provided through the integrated graphic user interface from the server operating system, the VWM server is configured to switch the one of the client operating systems comprising the requested application exists to the foreground; and
a VWM client comprised in the client operating system in which the requested application exists is configured to switch the requested application to the foreground in response to a request from the VWM server.

4. The virtualization apparatus of claim 3, wherein:
each of the operating systems comprises a device driver configured to support direct access to a graphic device comprised in the hardware device; and
the one of the client operating systems comprising the application requested for execution switched to the foreground is configured to output graphic data of the requested application switched to the foreground to the display through the device driver comprised in the client operating system in which the application is present.

5. The virtualization apparatus of claim 2, wherein each of the operating systems further comprises the graphic user interface providing unit configured to display an operation status of the operating systems.

6. The virtualization apparatus of claim 5, wherein the graphic user interface providing unit of the server operating system set as the main domain is configured to configure the integrated graphic user interface to display application information in an integrated fashion in a single window using application information about at least one of applications executable in the main domain and applications executable in the sub-domain, according to a user input.

7. The virtualization apparatus of claim 5, wherein the graphic user interface providing unit of the server operating system set as the main domain is configured to configure the integrated graphic user interface to display information of each domain in which the applications executable on the operating systems exist.

8. The virtualization apparatus of claim 5, wherein:
the graphic user interface providing unit of the one or more client operating systems set as the sub-domain comprises a window manager that is configured to manage a window stack indicating how windows of the foreground domain overlay one another on the display;
the windows are configured to display operations of all applications running on the sub-domain; and
the VWM client is configured to control a window to be displayed in the foreground that displays the requested application.

9. The virtualization apparatus of claim 5, wherein:
the server operating system set as the main domain further comprises an application runtime manager (ARM)_main configured to manage execution of an application provided through the integrated graphic user interface; and
the one or more client operating systems set as the sub-domain further comprises an ARM_sub configured to manage execution of an application installed in the one or more client operating systems.

10. The virtualization apparatus of claim 9, wherein:
the ARM_main is configured to identify an operating system in which the requested application exists in response to the application execution request being received through the graphic user interface; and
the ARM_main is configured to request the ARM_sub of the one or more client operating systems to execute the requested application in response to the requested application being present in the one or more client operating systems.

11. The virtualization apparatus of claim 10, wherein:
the one or more client operating systems set as the sub-domain each comprises an event agent (EA)_sub configured to manage events on the respective one or more client operating systems, the events comprising start and termination of an application; and
the EA_sub is configured to request the VWM server to switch an application which is executable on the one or more client operating systems to the foreground.

12. The virtualization apparatus of claim 2, wherein:
the server operating system further comprises a virtual window system (VWS) alive manager (VAM) server configured to monitor an operational status of a virtual window system service that provides the integrated graphic user interface; and
the server operating system and each of the one or more client operating systems comprise a VAM client configured to monitor an operational status of the virtual window system service.

13. The virtualization apparatus of claim 2, wherein the server operating system set as the main domain further comprises a task manager configured to manage tasks of applications executed on the operating systems.

14. The virtualization apparatus of claim 2, wherein:
the server operating system set as the main domain comprises an event agent (EA)_main configured to manage events occurring in the operating systems and a configuration synchronizer (CS)_main configured to manage settings of the operating systems; and
the one or more client operating systems comprises an event agent (EA)_sub configured to provide the EA_main with information of an event occurring on the sub-domain and a CS_sub configured to provide the CS_main with information of settings of the sub-domain.

15. The virtualization apparatus of claim 1, wherein:
the VWM server is configured to manage a window stack that indicates how windows of the foreground overlay one another on the display; and
the windows are configured to display operations of applications executable on the operating systems.

16. A virtualization apparatus comprising:
a hardware device comprising at least a processor;
a display;
a virtual machine monitor executing on the hardware device to support execution of operating systems,
wherein the operating systems comprise a server operating system set as a main domain that provides an integrated graphic user interface, and one or more client operating systems set as sub-domains, wherein the server operating system comprises a virtual window manager (VWM) server configured to, in response to a request for execution of an application in one of the client operating systems, switch the one of the client operating systems comprising the application requested for execution from being in a background to being in a foreground of the integrated graphic user interface, and determine to display both the application requested for execution and a screen configuration of the one of the client operating systems comprising the application requested for execution in the foreground, wherein the server operating system and each of the client operating systems comprises a virtual window manager (VWM) client configured to switch the application to the foreground in response to the request from the VWM server, wherein the server operating system is configured to manage domain role information of the main domain and the sub domain and further comprises a virtual window system (VWS) configuration manager (VCM) server, wherein the server operating system and each of the one or more client operating systems further comprise a VCM client configured to set the corresponding one or more client operating systems as the main domain or the sub-domain according to the domain role information of the VCM server, wherein only a single operating system of the operating systems is set as the main domain and the other operating systems are set as the sub-domains, wherein the integrated graphic user interface provided by the server operating system comprises information about applications executable on the operating systems, and to receive the application execution request;

wherein the sub-domain is configured to provide the main domain with application information, wherein each of the operating systems further comprises a graphic user interface providing unit configured to display an operation status of the respective operating systems, wherein the server operating system set as the main domain further comprises a software registration manager (SRM)_main configured to receive information of an application executable on the server operating system and application information provided from the one or more client operating systems, and provide the received information to the graphic user interface providing unit of the server operating system for display on the integrated graphic user interface, and wherein the one or more client operating systems set as the sub-domain further comprises an SRM_sub configured to transmit to the SRM_main application information of an application executable on the one or more client operating systems.

17. The virtualization apparatus of claim 16, wherein the SRM_sub is configured to install a new application in response to a request from the SRM_main which has received an installation request of an application from a user, and to transmit application information of the newly installed application to the SRM_main such that the application information can be added to the integrated graphic user interface.

18. A method of operating a virtualization apparatus which includes a processor, a hardware device, a display, a virtual machine monitor executing on the hardware device to support execution of operating systems that comprise a server operating system and one or more client operating systems, the method comprising:

setting the server operating system as a main domain and the one or more client operating systems as sub-domains;

providing, by the server operating system set as the main domain, an integrated graphic user interface to display applications executable on the operating systems;

providing application information to the main domain from the one or more client operating systems set as sub-domains, wherein only a single operating system of the operating systems is set as the main domain and the other operating systems are set as sub-domains;

in response to receiving a request for execution of an application in one of the client operating systems corresponding to one of application information provided through the integrated graphic user interface, switching, at the server operating system, the one of the client operating systems comprising the application requested for execution from being in a background to being in a foreground of the integrated graphic user interface;

displaying the application requested for execution and a screen configuration of the one of the client operating systems comprising the application requested for execution in the foreground; and switching, at the client operating system in which the requested application exists, the requested application to the foreground and providing the requested application, and wherein the server operating system further comprises a software registration manager (SRM)_main configured to:

receive information of an application executable on the server operating system and application information provided from the one or more client operating systems regarding the application requested for execution, and provide the received information to a graphic user interface providing unit of the server operating system to display operation status of the operating systems.

19. The method of claim 18, further comprising:

changing settings of the main domain and the sub-domains according to a user input signal.

20. The method of claim 18, wherein the providing of the integrated graphic user interface to display applications executable on the operating systems comprises configuring the integrated graphic user interface to display application information executable in the server operating system and the one or more client operating systems in an integrated fashion in a single window using the application information of applications executable on the server operating system set as the main domain and the application information provided from the one or more client operating systems set as the sub-domains.

* * * * *